United States Patent
Navarro Fructuoso et al.

(10) Patent No.: US 11,017,546 B2
(45) Date of Patent: May 25, 2021

(54) METHOD AND DEVICE FOR DEPTH DETECTION USING STEREO IMAGES

(71) Applicant: Huawei Technologies Co., Ltd., Sheznhen (CN)

(72) Inventors: Hector Navarro Fructuoso, Munich (DE); Manuel Martinez Corral, Burjassot (ES); Genaro Saavedra Tortosa, Burjassot (ES); Jorge Sola Pikabea, Burjassot (ES); Juan Carlos Barreiro Hervas, Burjassot (ES); Seokmin Hong, Burjassot (ES)

(73) Assignee: Huawei Technologies Co., Ltd., Sheznhen (CN)

( * ) Notice: Subject to any disclaimer, the term of this patent is extended or adjusted under 35 U.S.C. 154(b) by 178 days.

(21) Appl. No.: 16/392,284

(22) Filed: Apr. 23, 2019

(65) Prior Publication Data

US 2019/0251700 A1 Aug. 15, 2019

Related U.S. Application Data

(63) Continuation of application No. PCT/EP2016/075714, filed on Oct. 26, 2016.

(51) Int. Cl.
*G06T 7/593* (2017.01)
*G06T 3/40* (2006.01)

(52) U.S. Cl.
CPC .............. *G06T 7/593* (2017.01); *G06T 3/40* (2013.01); *G06T 2207/10012* (2013.01); *G06T 2207/10028* (2013.01)

(58) Field of Classification Search
CPC . G06T 7/593; G06T 3/40; G06T 2207/10012; G06T 2207/10028
See application file for complete search history.

(56) References Cited

U.S. PATENT DOCUMENTS

| 5,522,789 A | 6/1996 | Takahashi |
| 6,259,865 B1 | 7/2001 | Burke et al. |
| (Continued) | | |

FOREIGN PATENT DOCUMENTS

| CN | 1971340 A | 5/2007 |
| CN | 101902658 A | 12/2010 |
| (Continued) | | |

OTHER PUBLICATIONS

Gorthi et al., "Fringe Projection Techniques: Whither we are?" Optics and Lasers in Engiering, 48(2), pp. 133-140 (2010).
(Continued)

*Primary Examiner* — Carol Wang
(74) *Attorney, Agent, or Firm* — Leydig, Voit & Mayer, Ltd.

(57) ABSTRACT

A depth detection device includes a stereo image recording device, a scaler and a depth determiner is provided. The stereo image recording device is configured to record a stereo image of a scene, and includes a first optical path for recording a first image of the stereo image, and a second optical path for recording a second image of the stereo image. The first optical path and the second optical path have different lengths. The scaler determines a scaling of the first image or of the second image, by minimizing differing lateral magnification of objects in the scene, and for performing the scaling. The depth determiner determines a depth map of the scene based upon the scaled stereo image.

15 Claims, 7 Drawing Sheets

(56) References Cited

U.S. PATENT DOCUMENTS

| | | | |
|---|---|---|---|
| 7,705,970 B2 | 4/2010 | Piestun et al. | |
| 2003/0152264 A1* | 8/2003 | Perkins | H04N 13/161 |
| | | | 382/154 |
| 2004/0264765 A1* | 12/2004 | Ohba | G06T 7/12 |
| | | | 382/154 |
| 2012/0320164 A1 | 12/2012 | Lipton | |
| 2013/0038689 A1* | 2/2013 | McDowall | A61B 1/00045 |
| | | | 348/45 |
| 2013/0077853 A1* | 3/2013 | Chauvier | H04N 13/139 |
| | | | 382/154 |
| 2013/0321790 A1 | 12/2013 | Kirby | |
| 2014/0177942 A1* | 6/2014 | Luo | G06T 7/593 |
| | | | 382/154 |
| 2014/0225887 A1* | 8/2014 | Aguirre-Valencia | |
| | | | G06T 15/20 |
| | | | 345/419 |
| 2015/0109513 A1* | 4/2015 | Nayar | H04N 5/23216 |
| | | | 348/349 |

FOREIGN PATENT DOCUMENTS

| | | |
|---|---|---|
| CN | 102073050 A | 5/2011 |
| CN | 102740103 A | 10/2012 |
| CN | 102740104 A | 10/2012 |
| CN | 103154816 A | 6/2013 |
| CN | 103945208 A | 7/2014 |
| KR | 20140037301 A | 3/2014 |
| WO | 2011002515 A1 | 1/2011 |
| WO | 2015015383 A2 | 2/2015 |

OTHER PUBLICATIONS

Schechner et al., "Depth from Defocus vs. Stereo: How Different Really Are They?" International Journal of Computer Vision 39(2), 141-162, Kluwer Academic Publishers, Netherlands (2000).

"Basler Time-of-Flight Camera," Basler, Retrieved from the Internet:http://www.baslerweb.com/en/products/cameras/3d-cameras/time-of-flight-camera, (Jun. 12, 2019).

* cited by examiner

METHOD AND DEVICE FOR DEPTH DETECTION USING STEREO IMAGES

CROSS-REFERENCE TO RELATED APPLICATIONS

This application is a continuation of International Application No. PCT/EP2016/075714, filed on Oct. 26, 2016, the disclosure of which is hereby incorporated by reference in its entirety.

TECHNICAL FIELD

The disclosure relates to determining depth information of scenes from stereo images of the respective scene.

BACKGROUND

Currently, depth information is obtained optically by means of two kinds of systems, namely, passive and active devices.

Active systems are based on controlling the illumination of the scene in the spatial domain, as in pattern projection techniques and/or in the temporal domains, as in time-of-flight cameras. These systems, however, present a low versatility since they can work properly only in a limited operation regime, regarding both the scenes and the illumination sources that can be used. For instance, the natural background light in a natural scene can severely compromise the signal-to-noise ratio in these devices. On the other hand, several of such devices working at the same time generate a strong crosstalk resulting in interference, leading to complex and noisy detection schemes. Finally, their need to produce and control their own adapted illumination adds an extra power consumption that limits their use in many applications as autonomous video surveillance or in portable imaging systems, such as mobile phones.

Regarding passive systems, the 3D information in the scene is extracted by use of either a single, monocular, camera or different cameras, stereo or multi-ocular. In the monocular architecture, different strategies are possible both for single shot configurations, including wavefront coding engineering and for multi-shot, time multiplexing, schemes. However, the use of complex pupil masks with a poor response with natural light in the first case and the low response time in the second one, make these approaches very limited in practical applications with conventional real scenes.

For example a first stereo image is shown in FIG. 1a, while a second stereo image is shown in FIG. 1b. In FIG. 1c, an overlapping view of both stereo images is shown.

The solution that best fits the operation conditions in natural dynamic scenes is obtained when several cameras are used to capture different views of the scene. Nevertheless, some limitations in the depth estimation apply to these techniques. Since the comparison of the different images is the basis for the 3D location of the objects in the scene, the use of different sensors and lenses leads to long calibration procedures to account for the different responses of the cameras, both from a geometrical point of view—rectification, distortion compensation—and from a photo/electronic point of view—pixel response equalization.

Considering the passive system for depth estimation, stereo technology is the one that provides superior results. However, such technology has the drawback of needing to calibrate and synchronize two independent cameras. In some cases, the sensors are very expensive and/or energy consuming.

The "Catadioptric monocular stereo-camera", which corresponds to the above-mentioned single shot configuration, allows for obtaining stereo images, but due to the optical setup, the scale of the objects appearing in both images is different for each depth. This is a serious problem, since the conventional low complexity block matching algorithms, just searching for the displarity in rows, cannot be applied for real time depth estimation. Usually, stereo cameras are arranged so that the axial difference between the two cameras is negligible. The small differences can be corrected digitally. Such an arrangement is though not always possible, resulting in a different length of the optical paths of the two stereo images and thereby resulting in a different lateral scaling of the stereo images. Also, in the case of using only a single camera and switching between two different optical paths, this problem occurs, since for reasons of optical path geometry, usually different optical path lengths occur. This can readily be seen in FIG. 4 and FIG. 5.

SUMMARY

Accordingly, an object of the present disclosure is to provide an apparatus and method, which allow for determining an accurate depth map with a high flexibility regarding the geometry of optical paths within the camera or cameras used for recording the stereo images.

The object is solved by the features of claim 1 for the apparatus and claim 14 for the method. The dependent claims contain further developments.

According to a first aspect of the disclosure, a depth detection device comprising a stereo image recording device, a scaler and a depth determiner is provided. The stereo image recording device is configured to record a stereo image of a scene. The stereo image recording device comprises a first optical path, configured to record a first image of the stereo image, and a second optical path, configured to record a second image of the stereo image. The first optical path and the second optical path are of different lengths. The scaler is configured to determine a scaling of the first image or of the second image, by minimizing differing lateral magnification of objects in the scene depicted in the first image and the second image, and for performing the determined scaling, resulting in a scaled stereo image. The depth determiner is configured to determine a depth map of the scene based upon the scaled stereo image. By performing the scaling, it is possible to reduce the negative impact of the differing length of the optical paths and thereby to increase their accuracy of the determined depth map.

According to a first implementation form of the first aspect, the scaler is configured to determine the scaling of the first image or of the second image, taking stereo image parameters into account. The stereo image parameters comprise a baseline of the stereo image and/or a focal length of the stereo image recording device and/or an aperture of the stereo image recording device and/or a resolution of the stereo image recording device and/or a length of the first optical path and/or a length of the second optical path. An especially accurate determining of the optimum scaling is thereby possible.

According to a second implementation form of the first aspect or the previous implementation form, the scaler is configured to determine the scaling of the first image or of the second image, taking scene parameters into account. The scene parameters comprise a depth range, and/or a depth distribution of the objects in the scene. A further increase in determining the optimum scaling factor can thereby be achieved.

According to an implementation form of the previous two implementation forms, the scaler is configured to determine a mathematical model of the stereo image recording device and/or the scene, based upon the stereo image parameters and/or the scene parameters. The scaler is configured to determine the scaling of the first image or of the second image based on the mathematical model. A further increase of the accuracy of determining the optimum scaling factor can thereby be achieved.

According to a further implementation form of the first aspect or the previous implementation forms, the scaler is configured to determine a scaling factor $M_0^{opt}$ as $$M_0^{opt} = 1 + \frac{\Delta \log \frac{z_2}{z_1}}{z_2 - z_1},$$

wherein $\Delta$ is a difference in the optical length of the first optical path and the second optical path, $z_1$ is a lower limit of a depth range of the scene, and $z_2$ is an upper limit of a depth range of the scene. An especially accurate determining of an optimal scaling factor is thereby achieved.

According to a further implementation form of the first aspect or the previous implementation forms, the depth detection device comprises a calibrator, which is configured to perform a calibration of the depth detection device based upon a known reference scene and a known depth map of the known reference scene, resulting in a calibration function and perform the calibration function on every determined depth map after determining the depth map by the depth determiner, resulting in a calibrated depth map. A further increase of accuracy of determining the depth map can thereby be achieved.

According to an implementation form of the previous implementation form, the stereo image recording device is configured to record a calibration stereo image of the known reference scene. The scaler is then configured to determine a scaling of the first image or of the second image of the calibration stereo image, by minimizing differing lateral magnification of objects in the scene depicted in the first image and the second image of the calibration stereo image and perform the determined scaling resulting in a scaled calibration stereo image. The depth determiner is then configured to determine a calibration depth map of the known reference scene based upon the scaled calibration stereo image. The calibrator is then configured to determine differences of the calibration depth map and the known depth map and determine the calibration function from the differences of the calibration depth map and the known depth map. An especially accurate calibration can thereby be performed.

According to a further implementation form of the previous two implementation forms, the calibrator is configured to determine the calibration function as a non-linear function. By use of a non-linear function, an especially accurate calibration is possible.

According to a further implementation form of the previous three implementation forms, the calibrator is configured to determine the calibration function as an image transformation matrix. This results in an especially accurate calibration.

According to a further implementation form of the first aspect or any of the previous implementation forms, the stereo image recording device is configured to record the first image of the stereo image and the second image of the stereo image displaced by a baseline. It is thereby possible to determine the depth map based upon the stereo image.

According to a further implementation form of the first aspect or the previous implementation forms, the stereo image recording device comprises a single camera and an optical splitter. The single camera is configured for recording the first image and the second image successively. The optical splitter is configured for switching between the first optical path and the second optical path successively. It is thereby possible to use only a very limited number of hardware elements, especially only a single camera. Also, it is thereby possible to remove negative influences by slightly differing cameras, in case of using two cameras.

According to an implementation form of the previous implementation form, the optical splitter comprises a beam splitter arranged in front of the single camera and a total reflection prism arranged in a beam splitting direction of the beam splitter. The first optical path leads from the scene to the total reflection prism to the beam splitter to the single camera. The second optical path leads from the scene to the beam splitter to the single camera. This allows for a very simple implementation of the depth detection device. The beam splitter may be a beam-splitting cube, for example. Preferably, the beam splitter is placed directly in front of the single camera.

According to a further implementation form of the previous two implementation forms, the optical splitter comprises a first shutter device arranged within the first optical path, but not within the second optical path and a second shutter device arranged within the second optical path, but not within the first optical path. The first shutter device is configured to shut the first optical path during recording of the second image by the single camera and open the first optical path during recording the first image by the single camera. The second shutter device is configured to shut the second optical path during recording of the first image by the single camera and open the second optical path during recording the second image by the single camera. This effectively prevents stray image information from the presently non-recorded optical path to negatively influence the presently recorded image.

According to a further implementation form of the first aspect or any of the first nine implementation forms of the first aspect, the stereo image recording device comprises a first camera for recording the first image and a second camera for recording the second image. The first camera and the second camera are located at different distances from the scene, resulting in the different lengths of the first optical path and the second optical path. By this configuration, the hardware effort used for beam splitting can be saved.

According to a second aspect of the disclosure, a depth detection method is provided. The depth detection method comprises recording a stereo image of a scene, using a stereo image recording device, comprising a first optical path and a second optical path, wherein the first image of the stereo image is recorded through the first optical path and a second image of the stereo image is recorded through the second optical path, and wherein the first optical path and the second optical path are of different lengths. Moreover, the method comprises determining a scaling of the first image or of the second image, by minimizing differing lateral magnification of objects in the scene depicted in the first image and the second image and performing the determined scaling, resulting in a scale stereo image. Finally, the method comprises determining a depth map of the scene based upon the scale stereo image. By performing the scaling, it is possible to reduce the negative impact of the differing length of the optical paths and thereby to increase the accuracy of the determined depth map.

According to a first implementation form of the second aspect, the scaling is performed taking stereo image parameters into account. The stereo image parameters comprise a baseline of the stereo image and/or a focal length of the stereo image recording device and/or an aperture of the stereo image recording device and/or a resolution of the stereo image recording device and/or a length of the first optical path and/or a length of the second optical path. An especially accurate determining of the optimum scaling is thereby possible.

According to a second implementation form of the second aspect or the previous implementation form, the scaling is determined taking scene parameters into account, which comprise a depth range and/or a depth distribution of the objects in the scene. A further increase in determining the optimum scaling factor can thereby be achieved.

According to a further implementation form of the previous two implementation forms of the second aspect, a mathematical model of the stereo image recording device and/or the scene is determined based upon the stereo image parameters and/or the scene parameters. The scaling factor is determined based upon the mathematical model. A further increase of the accuracy of determining the optimum scaling factor can thereby be achieved.

According to a further implementation form of the second aspect or the previous implementation forms, the scaler is configured to determine a scaling factor $M_0^{opt}$ as $$M_0^{opt} = 1 + \frac{\Delta \log \frac{z_2}{z_1}}{z_2 - z_1},$$

wherein $\Delta$ is a difference in optical length of the first optical path and the second optical path, $z_1$ is a lower limit of a depth range of the scene and $z_2$ is an upper limit of a depth range of the scene. An especially accurate determining of an optimal scaling factor is thereby achieved.

According to a further implementation form of the second aspect or the previous implementation forms, a calibration of the depth detection based upon a known reference scene and a known depth map of the known reference scene is performed, resulting in a calibration function. The calibration function is performed on every determined depth map after determining the depth map, resulting in a calibrated depth map. A further increase of accuracy of determining the depth map can thereby be achieved.

According to an implementation form of the previous implementation form, a calibration stereo image of the known reference scene is recorded. A scaling of the first image and/or of the second image of the calibration stereo image is determined, by minimizing different lateral magnifications of objects in the scene depicted in the first image and the second image of the calibration stereo image. The scaling is performed on one of the images resulting in a scaled calibration stereo image. A calibration depth map is determined based upon the scaled calibration stereo image. Differences of the calibration depth map and the known depth map are then determined. Finally, a calibration function is determined from these differences. An especially accurate calibration can thereby be performed.

According to an implementation form of the previous two implementation forms, the calibration function is determined as a non-linear function. By use of a non-linear function, an especially accurate calibration is possible.

According to a further implementation form of the previous three implementation forms, the calibration function is determined as an image transformation matrix. It is thereby possible to determine the depth map based upon the stereo image.

According to a further implementation form of the second aspect or any of the previous implementation forms, the first image and the second image are recorded displaced by a baseline. It is thereby possible to determine the depth map based upon the stereo image.

According to a further implementation form of the second aspect or the previous implementation forms of the second aspect, a single camera is configured for successively recording the first image and the second image, while an optical splitter switches between the first optical path and the second optical path successively. It is thereby possible to use only a very limited number of hardware elements, especially only a single camera. Also, it is thereby possible to remove negative influences by slightly differing cameras, in case of using two cameras.

Alternatively, in a further implementation form of the second aspect or the first nine implementation forms of the second aspect, the first image is recorded by a first camera and the second image is recorded by a second camera. By this configuration, the hardware effort used for beam splitting can be saved.

Generally, it has to be noted that all arrangements, devices, elements, units and means and so forth described in the present application could be implemented by software or hardware elements or any kind of combination thereof. Furthermore, the devices may be processors or may comprise processors, wherein the functions of the elements, units and means described in the present applications may be implemented in one or more processors. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description of a specific detailed element of that entity which performs that specific step or functionality, it should be clear for a skilled person that these methods and functionalities can be implemented in respect of software or hardware elements, or any kind of combination thereof.

BRIEF DESCRIPTION OF DRAWINGS

The present disclosure is in the following explained in detail in relation to embodiments of the disclosure in reference to the enclosed drawings, in which.

Figure 1A:
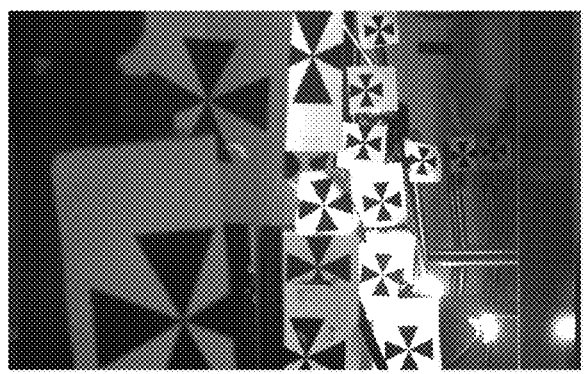
FIG. 1a shows a first image of a stereo image.
Figure 1B:
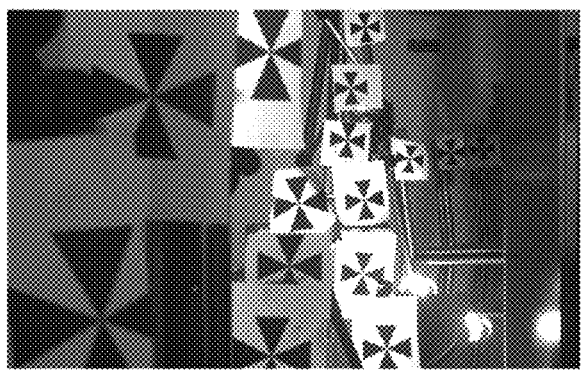
FIG. 1b shows a second image of a stereo image.
Figure 1C:
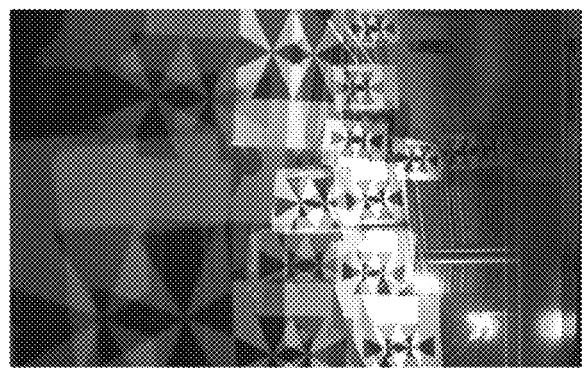
FIG. 1c shows the first image and the second image of the stereo image in an overlapping fusion.

First, the concept of depth estimation by use of stereo images was described along FIG. 1a-1c. In the following, along FIG. 2-FIG. 5, the construction and function of different embodiments of the inventive device are shown. Along FIG. 6-FIG. 7, the functions of different embodiments of the inventive method are described. Finally along FIG. 8, further benefits of the disclosure are eliminated.

Similar entities and reference numbers in different figures have been partially omitted.

DESCRIPTION OF EMBODIMENTS

Figure 2:
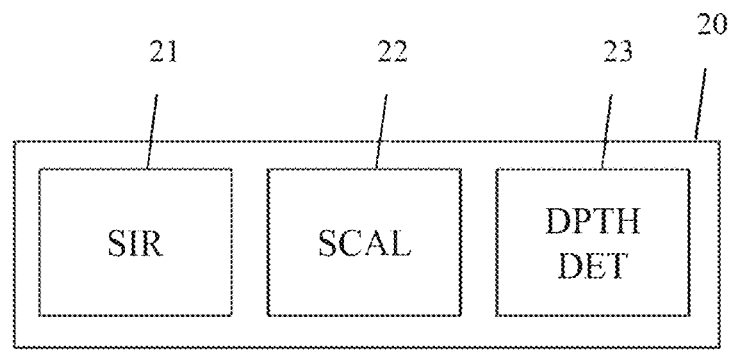
FIG. 2 shows a first embodiment of the first aspect of the disclosure.

In FIG. 2, a first embodiment of a depth determining device 20 is shown. The depth determining device comprises a stereo image recording device 21, a scaler 22 and a depth determiner 23.

Figure 3:
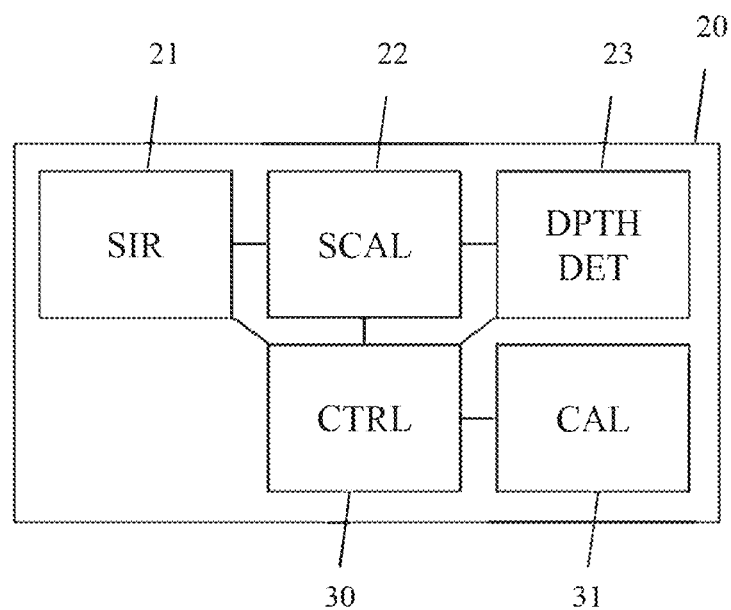
FIG. 3 shows a second embodiment of the first aspect of the disclosure.

In FIG. 3, a second embodiment of the inventive depth detection device 20 is shown. Here, the depth determining device 20 furthermore comprises a control unit 30 and a calibrator 31. The control unit 30 is connected to the units 21, 22, 23 and 31 and controls these.

The scaler 22 is moreover connected to the stereo image recording device 21 and to the depth determiner 23.

The stereo image recording device 21 is configured for recording a stereo image comprising a first image and a second image. The construction of the stereo image recording device 21 is further detailed in FIG. 4 and FIG. 5. The first image is recorded through a first optical path, while the second image is recorded through a second optical path. The optical paths are of different lengths.

After the first image and the second image have been recorded, they are handed to the scaler 22, which performs a scaling of the first image or the second image in order to compensate for differing lateral magnification of objects in the scene depicted in the first image and the second image. This is done by first determining an optimal scaling and afterwards performing the scaling on the stereo image resulting in a scaled stereo image. The scaled stereo image is handed on to the depth determiner 23, which performs a depth determination resulting in a depth map of the scene.

In the example, the calibrator 31 performs a calibration using a known reference scene and an accordingly known depth map of the known reference scene. This is done by recording a stereo image of the known reference scene using the stereo image recording device 21, performing a scaling by the scaler 22, as explained above, and by performing a depth determining by the depth determiner 23, as also explained above. The resulting calibration depth map is compared to the known depth map. The calibrator 31 determines a calibration function therefrom. The calibration function advantageously is a non-linear function. Also, the calibration function advantageously is an image transformation matrix.

Figure 4:
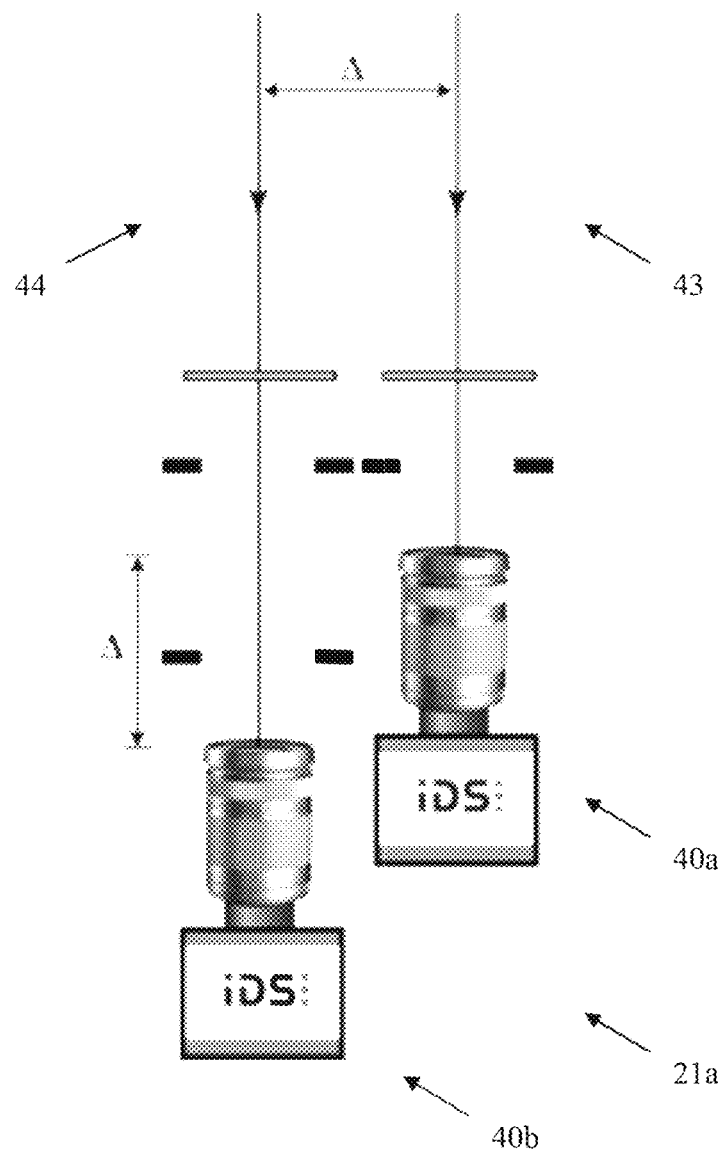
FIG. 4 shows a detail of a third embodiment of the first aspect of the disclosure.

In FIG. 4, the stereo image recording device 21a, which corresponds to the stereo image recording device 21 of FIG. 2 and FIG. 3, is shown. Here, the stereo image recording device 21a comprises a first camera 40a and a second camera 40b. Both cameras 40a, 40b are arranged side by side, but axially displaced relative to each other, resulting in a first optical path 43 and a second optical path 44 differing in length. The optical paths 43, 44 have a differing length with regard to the depicted scene. Also, the cameras 40a, 40b are laterally displaced relative to each other by a baseline.

Figure 5:
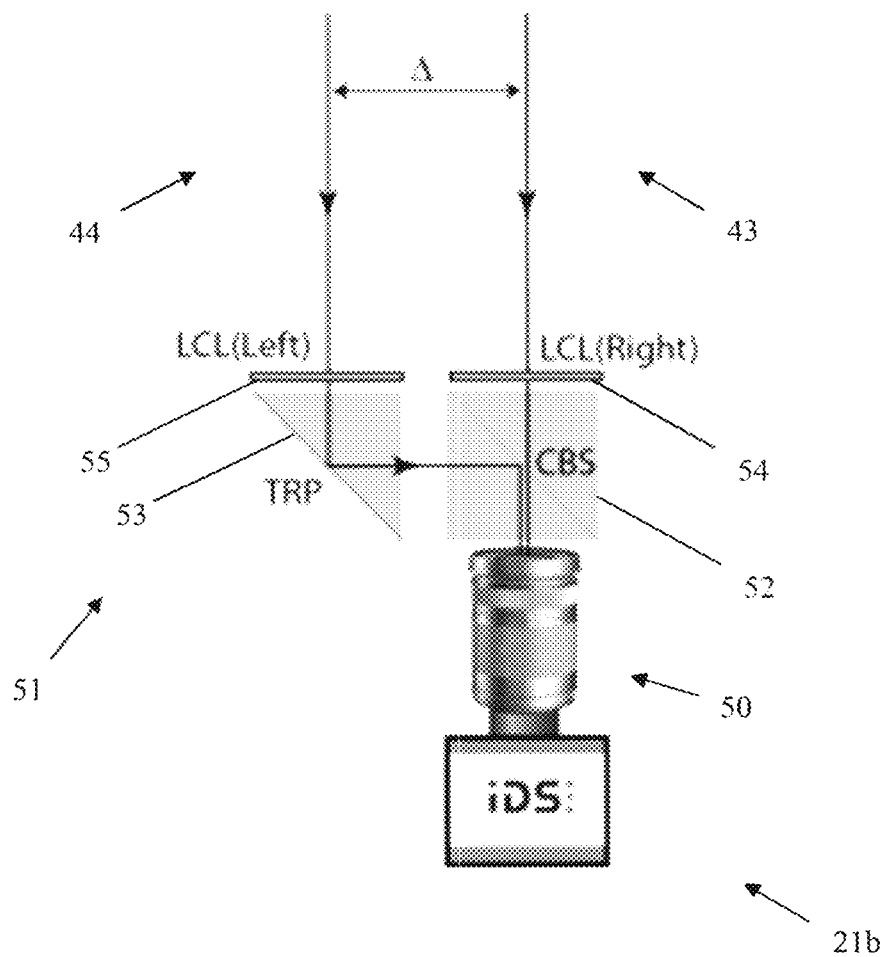
FIG. 5 shows a detail of a fourth embodiment of the first aspect of the disclosure.

In FIG. 5, a further alternative embodiment of the stereo image recording device 21b, which corresponds to the stereo image recording device 21 of FIG. 2 and FIG. 3, is shown. Here, the stereo image recording device 21b merely comprises a single camera 50 and an optical splitter 51. The optical splitter 51 is arranged between the camera 50 and the depicted scene. Through the optical splitter 51, the first optical path 43 and the second optical path 44 have differing lengths, as already shown in FIG. 4.

The optical splitter 51 in this embodiment comprises a beam splitter (e.g., a beam splitting cube) 52, which is arranged closely in front of the single camera 50. Moreover, it comprises a total reflection prism 53, which is arranged in a beam splitting direction of the beam splitter 52. The first optical path 43 leads from the scene to the beam splitter 52 to the single camera 50. The second optical path 43 leads from the scene to the total reflection prism 53 to the beam splitter 52 to the single camera 50.

In the example, the optical splitter 51 moreover comprises shutters 54, 55, which are arranged on the optical paths. A first shutter 54 is arranged on the first optical path 43 between the scene and the beam splitting 52. A second shutter 55 is arranged between the scene and the total reflection prism 53. The shutters 54, 55 shut the optical path which is currently not recorded. This means that while recording the first image through the first optical path 43, the first shutter 54 is open while the second shutter 55 is closed. While recording the second image through the second optical path 44, the second shutter 55 is open while the first shutter 54 is closed.

Note that the proposed system is equivalent to a virtual stereo camera with axes separated by baseline d, but placed at different depths, also separated by an offset A. The maximum light efficiency of any branch of the virtual stereo camera is of 25%, obtained as the product of the maximum efficiency of the LCL (50%) and of the CBS (50%). This implies that in terms of light efficiency, the effective f-number of any virtual camera is equal to the f-number of the objective plus 2.0 units.

In order to obtain enough luminosity, together with sufficient depth of field, we need to take into account that the depth of field, $\Delta_F$, of a photographic camera is given by $$\Delta_F = k \frac{f_\#}{f^2},$$

where k is a proportionality factor, and $f_\#$ the f-number. Then the proposed camera must have an objective lens with small focal length (smaller than f=20 mm).

An important issue to take into account is the fact that the field of view FOV) limitation is different in the two branches of the virtual camera. In a single camera the FOV is limited by the sensor size and by the field aperture. In the proposed design the field apertures are given by the projection of reflecting elements onto the plane perpendicular to the optical axis. Such projections are represented in FIG. 1(b) by means of the virtual apertures. As it is well known, further field apertures produce stronger FOV limitation. So, FOV limitation in the left image is stronger than FOV limitation in the right image. Problems with FOV limitation can be avoided by placing the TRP and the CBS in contact or close to contact.

In the following, the functions of the different elements of the depth determining device 20 are explained in greater detail:

The disclosure tries to minimize the scale difference for the objects located at different depths on each image. In order to do that, we calculate the affine transformation minimizing the difference in the lateral magnification over the camera sensor for the axial interval of interest. Next this process will be described in a more detailed manner:

It must be taken into account that the distance to the objects, and the consequent magnification, is not the same for the two virtual cameras. Even the magnification offset depends on the distance to the object. In this sense we can define the function $$M(\Delta, z) = 1 + \frac{\Delta}{z}, \quad (3)$$

which gives a relation between the scales of left and right images. In this function $\Delta$ is the distance between virtual axes, and z is the distance between the right camera and the object. Now we define the square residual $$\varepsilon^2 = (M(\Delta, z) - M_0)^2 \quad (4)$$

where $M_0$ is a value of magnification to be optimized. Next we can evaluate the sum of square residuals $$\sigma^2 = \int_{z_1}^{z_2} \varepsilon^2 dz, \quad (5)$$

where $z_1$ and $z_2$ are the limits of the axial range. Finally we calculate the minimum of this function, that is $$\frac{d\sigma^2}{dM_0} = 0, \quad (6)$$

and therefore obtain the optimum value for $M_0$ $$M_0^{opt} = 1 + \frac{\Delta \log \frac{z_2}{z_1}}{z_2 - z_1}. \quad (7)$$

As an example, we can calculate the optimum re-scaling for the following values: $\Delta=20$ mm, $z_2=10.0$ m, and $z_1=1.0$ m. We obtain, $M_0^{opt}=1.0051$.

Our proposal is to scale by this factor the left image in a stereo pair and all the left images if a video-sequence is considered. This is not to be understood as the only option though. It is just as well possible to scale the other of the two images.

Once the left image has been scaled by the scaler 22, and it has been made sure that the two images are aligned along any line parallel to the baseline, a disparity map can be obtained by calculating point by point the disparity in pixel units, by the depth determiner 23. From the disparity map, expressed in pixel units, a depth map is calculated according the following formula:

$$z = \frac{d\Delta}{4g} p. \quad (8)$$

In the Eq. (8) d is the disparity measured in number of pixels; g is the gap between camera lens and the sensor (in case of object at infinity, g=f, being f the focal length), and p is the actual dimension of sensor pixels.

Since the use of a resealed left image for the disparity calculation is the result of a first order approximation, a nonlinear post calibration is needed for the accurate depth recovery. For the post calibration, a table with real and calculated depth distances must be done for a dense amount of sentences within the axial range. This table permits to define a post-calibration function.

In order to explain how the post-calibration works, we have implemented a prototype in which the baseline was $\Delta=30.5$ mm and the objective of f=50 mm operated at $f_\#=8.0$. We have tested a 3D scene composed by a series of 7×7 cm 2D objects with helix symbol, placed at equidistant positions from 1 to 10 m. The images are shown in FIG. 1a-1c.

Figure 8:
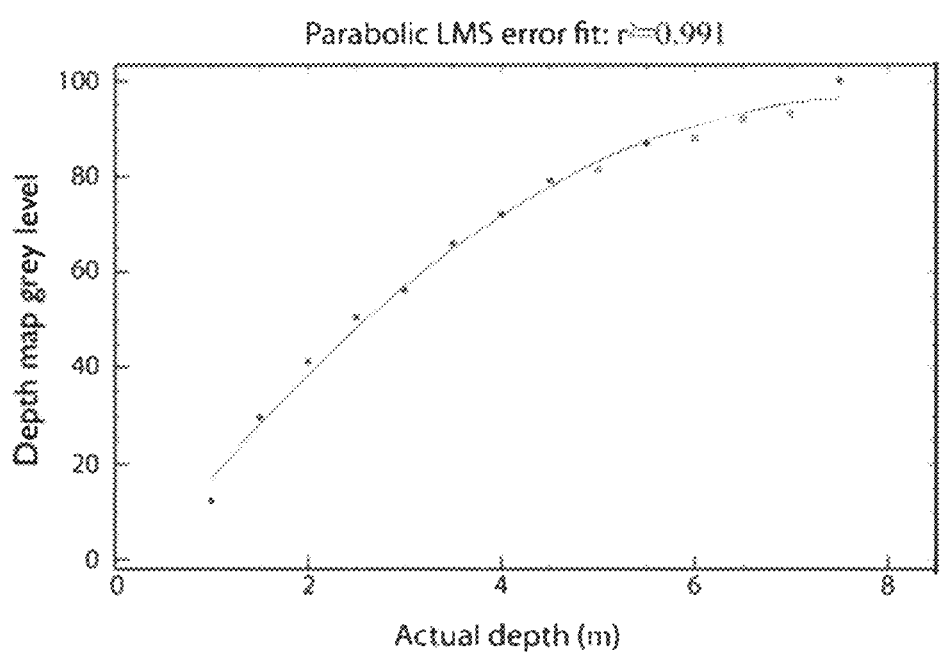
FIG. 8 shows results obtainable by use of the disclosure.

A representation of both calculated depth and directly measured distances is shown in FIG. 8, including a parabolic fitting of both results. The value of both the slope and correlation coefficient for the curve fitting shows the good agreement of the results under test.

It can therefore be seen that there is a remaining error between the actual depth and the depth map. By determining the calibration function by use of the calibrator 31, and then applying the calibration function to each depth map, which is determined by the depth determiner 23, a calibrated depth map is achieved. This calibrated depth map has significantly less error than the non-calibrated depth map. The calibration function therein advantageously is a non-linear function, especially an image transformation matrix. For determining the calibration function, a mathematical model may be used, as explained above.

Figure 6:
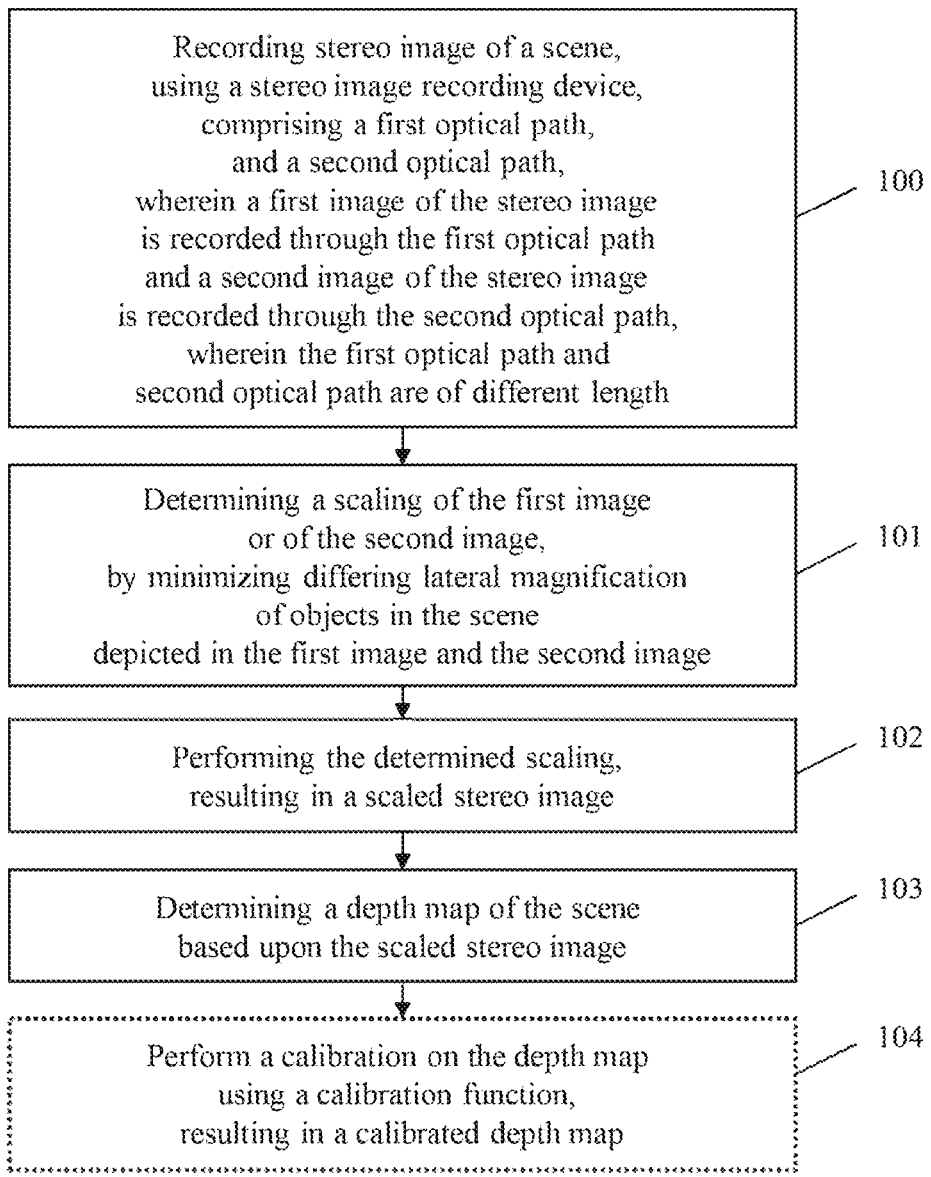
FIG. 6 shows a first embodiment of the second aspect of the disclosure.

In FIG. 6, a first embodiment of the inventive depth determining method is shown. In a first step 100, a stereo image of a scene is recorded using an image recording device. A first image of the stereo image is recorded through a first optical path while a second image of the stereo image is recorded through a second optical path. The two optical paths do not have the same lengths. In a second step 101, a scaling of the first image or of the second image is determined by minimizing differing lateral magnification of objects in the scene depicted in the first image and second image. Especially, scene parameters and stereo image recording device parameters of the stereo image recording device 21 may be used therefore.

In a third step 102, an according scaling is performed on one of the first image or the second image resulting in a scaled stereo image. In a fourth step 103, a depth map of the scene is determined based upon the scaled stereo image. In an optional final step 104, a calibration of the depth map is performed using a calibration function. This results in a calibrated depth map.

Figure 7:
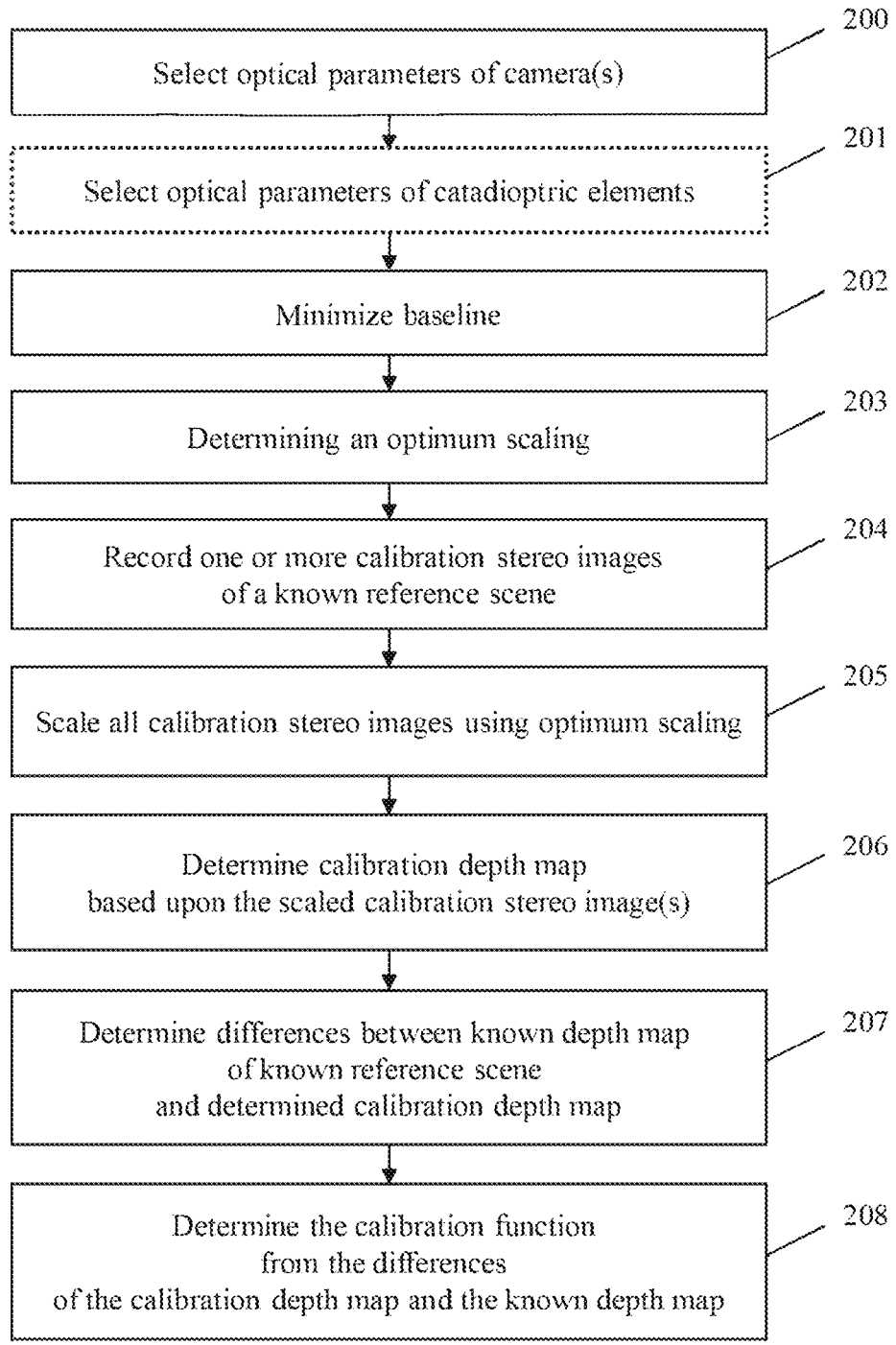
FIG. 7 shows a second embodiment of the second aspect of the disclosure.

An embodiment showing the calibration of step 104 of FIG. 6 is shown in FIG. 7. There, in a first step 200, optical parameters of the camera or cameras of the stereo image recording device 21 are selected. In an optional second step 201, further optical parameters of catadioptric elements, such as the total reflection prism 53 and the beam splitting 52 of FIG. 5 may be selected. In a third step 202, the elements are arranged in such a manner that the baseline of the two cameras is minimized. By minimizing the baseline, the differing optical lengths of the optical paths can be minimized therefore also minimizing the need for corrections. In a fourth step 203, an optimum scaling is determined, as explained earlier. In a fifth step 204, one or more calibration stereo images are recorded using a known reference scene. In a sixth step 205, the calibration stereo image or images are scaled according to the optimum scaling factor determined in step 203. In a seventh step 206, a calibration depth map is determined for each of the calibration stereo images. In an eighth step 207, differences between a known depth map of the known reference scene and the determined calibration depth map or maps are determined. In a final ninth step 208, a calibration function is determined based upon the differences of the calibration depth map and the known depth map. More than one calibration depth map can be taken into account here.

The embodiments are not limited to the examples and especially not to a specific type of construction of the stereo image recording device. The characteristics of the exemplary embodiments can be used in any advantageous combination.

Various embodiments are disclosed herein. However, other variations to the disclosed embodiments can be understood and effected by those skilled in the art from a study of the drawings, the disclosure, and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

What is claimed is:

1. A depth detection device, comprising:
a stereo image recording device configured to record a stereo image of a scene, and
one or more processors,
wherein the stereo image recording device comprises:
  a first optical path, configured to record a first image of the stereo image, and
  a second optical path, configured to record a second image of the stereo image,
wherein the first optical path and second optical path have different lengths,
wherein the one or more processors are configured to:
  determine a scaling of the first image or of the second image, by minimizing differing lateral magnification of objects in the scene depicted in the first image and the second image,
  perform the scaling on one of the first image or the second image, resulting in a scaled stereo image, and
  determine a depth map of the scene based upon the scaled stereo image.

2. The depth detection device according to claim 1,
wherein the one or more processors are configured to determine the scaling of the first image or of the second image, taking stereo image parameters into account, and
wherein the stereo image parameters comprise a baseline of the stereo image, and/or a focal length of the stereo image recording device, and/or an aperture of the stereo image recording device, and/or a resolution of the stereo image recording device, and/or a length of the first optical path, and/or a length of the second optical path.

3. The depth detection device according to claim 2,
wherein the one or more processors are configured to:
  determine a mathematical model of the stereo image recording device and/or the scene, based upon the stereo image parameters and/or scene parameters, and
  determine the scaling of the first image or of the second image based on the mathematical model.

4. The depth detection device according to claim 1,
wherein the one or more processors are configured to determine the scaling of the first image or of the second image, taking scene parameters into account, and
wherein the scene parameters comprise a depth range, and/or a depth distribution of the objects in the scene.

5. The depth detection device according claim 1,
wherein the one or more processors are configured to determine a scaling factor $M_0^{opt}$ as $$M_0^{opt} = 1 + \frac{\Delta \log \frac{z_2}{z_1}}{z_2 - z_1},$$

wherein $\Delta$ is a difference in optical length of the first optical path and the second optical path, $z_1$ is a lower limit of a depth range of the scene, and $z_2$ is an upper limit of a depth range of the scene.

6. The depth detection device according to claim 1,
wherein the one or more processors are configured to:
  perform a calibration of the depth detection device based upon a known reference scene and a known depth map of the known reference scene, resulting in a calibration function, and
  perform the calibration function on the depth map, resulting in a calibrated depth map.

7. The depth detection device according to claim 6,
wherein the stereo image recording device is configured to record a calibration stereo image of the known reference scene,
wherein the one or more processors are configured to:
  determine a second scaling of a third image or of a fourth image of the calibration stereo image, by minimizing differing lateral magnification of objects in a second scene depicted in the third image and the fourth image of the calibration stereo image,
  perform the second scaling, resulting in a scaled calibration stereo image,
  determine a calibration depth map of the known reference scene based upon the scaled calibration stereo image,
  determine differences of the calibration depth map and the known depth map, and
  determine the calibration function from the differences of the calibration depth map and the known depth map.

8. The depth detection device according to claim 6,
wherein the one or more processors are configured to determine the calibration function as a non-linear function.

9. The depth detection device according to claim 6,
wherein the one or more processors are configured to determine the calibration function as an image transformation matrix.

10. The depth detection device according to claim 1,
wherein the stereo image recording device is configured to record the first image of the stereo image and the second image of the stereo image displaced by a baseline.

11. The depth detection device according to claim 1,
wherein the stereo image recording device comprises a single camera and an optical splitter,
wherein the single camera is configured to record the first image and the second image successively, and
wherein the optical splitter is configured to switch between the first optical path and the second optical path successively.

12. The depth detection device according to claim 11,
wherein the optical splitter comprises:
a beam splitter arranged in front of the single camera, and
a total reflection prism arranged in a beam splitting direction of the beam splitter,
wherein the first optical path leads from the scene to the beam splitter to the single camera, and
wherein the second optical path leads from the scene to the total reflection prism to the beam splitter to the single camera.

13. The depth detection device according to claim 11,
wherein the optical splitter comprises:
a first shutter device arranged within the first optical path but not within the second optical path, and
a second shutter device arranged within the second optical path but not within the first optical path,
wherein the first shutter device is configured to:
shut the first optical path during recording the second image by the single camera, and
open the first optical path during recording the first image by the single camera, and
wherein the second shutter device is configured to:
shut the second optical path during recording the first image by the single camera, and
open the second optical path during recording the second image by the single camera.

14. The depth detection device according to claim 1,
wherein the stereo image recording device comprises a first camera for recording the first image, and a second camera for recording the second image, and
wherein the first camera and the second camera are located at differing distances from the scene, resulting in the different lengths of the first optical path and the second optical path.

15. A depth detection method, comprising:
recording a stereo image of a scene, using a stereo image recording device, the stereo image recording device comprising a first optical path and a second optical path, wherein a first image of the stereo image is recorded through the first optical path and a second image of the stereo image is recorded through the second optical path, wherein the first optical path and second optical path have different lengths,
determining a scaling of the first image or of the second image, by minimizing differing lateral magnification of objects in the scene depicted in the first image or the second image,
performing the scaling on one of the first image or the second image, resulting in a scaled stereo image, and
determining a depth map of the scene based upon the scaled stereo image.

* * * * *